United States Patent [19]

Williams

[11] 4,230,667

[45] Oct. 28, 1980

[54] REPLACEABLE CARTRIDGE TYPE OXYGEN GENERATOR AND OXYGEN SUPPLY SYSTEM INCLUDING A PLURALITY OF SUCH GENERATORS

[76] Inventor: Irving Williams, 4 Harav Uziel St., Tel Aviv, Israel

[21] Appl. No.: 943,745

[22] Filed: Sep. 19, 1978

[30] Foreign Application Priority Data

Sep. 20, 1977 [IL] Israel ..................................... 52970

[51] Int. Cl.² ............................................... B01J 7/00
[52] U.S. Cl. .................................... 422/113; 422/166; 422/117; 422/120; 422/119; 128/202.26
[58] Field of Search ............... 422/105, 117, 120, 164, 422/165, 166, 119, 113, 112, 116; 128/190, 191, 142 R

[56] References Cited

U.S. PATENT DOCUMENTS

| | | | |
|---|---|---|---|
| 3,052,526 | 9/1962 | Cook et al. | 422/166 X |
| 3,573,001 | 3/1971 | Bovard | 422/166 X |
| 3,736,104 | 5/1973 | Churchill et al. | 128/191 R |
| 3,981,300 | 9/1976 | Williams | 128/142 R |
| 4,138,218 | 2/1979 | McClure | 422/164 X |

Primary Examiner—Harry N. Haroian
Attorney, Agent, or Firm—Benjamin J. Barish

[57] ABSTRACT

A replaceable cartridge-type oxygen generator is described including a quick-opening pressure casing containing a chemical oxygen-generating cartridge having a severable hermetically-sealed container and an ignition device, the casing further including an actuating device capable of actuating the ignition device only when the cartridge is disposed within the casing and the casing is closed. The casing further includes a high-volume vent automatically effective in case of the sudden build-up of a high pressure, such as may be caused by the ignition of a contaminant. Also described is an oxygen supply system including a plurality of such generators connected to an outlet manifold having pressure sensing means controlling the ignition of the cartridges.

25 Claims, 15 Drawing Figures

REPLACEABLE CARTRIDGE TYPE OXYGEN GENERATOR AND OXYGEN SUPPLY SYSTEM INCLUDING A PLURALITY OF SUCH GENERATORS

BACKGROUND OF THE INVENTION

The present invention relates to a replaceable cartridge type oxygen generator, and also to an oxygen supply system including a plurality of such generators.

My prior U.S. Pat. No. 3,981,300 discloses oxygen supply systems for aircraft comprising a plurality of chemical oxygen generators each including an igniter which when energized causes its chemical oxygen generator to generate oxygen, and sequencer means connected to the igniter for energizing them in sequence. The oxygen generators are located outside of a common chamber and are individually connected to the common chamber via individual conduits. The system further includes a pressure sensor sensing the pressure in a predetermined part of the oxygen distribution system and controlling the sequencer to energize the igniters of the next required chemical oxygen generators in sequence.

An object of the present invention is to provide a replaceable cartridge type oxygen generator particularly useful in the systems described in my prior U.S. Pat. No. 3,981,300. Another object of the invention is to provide novel variations in oxygen supply systems including the novel replaceable cartridge type oxygen generators of the present application.

SUMMARY OF THE INVENTION

According to one aspect of the present invention, therefore, there is provided a replaceable cartridge type oxygen generator, comprising a quick-opening pressure casing including a main casing section, an openable casing section quickly openable and closable with respect to the main casing section, and a seal sealing the two sections when closed together. The casing is adapted to receive a chemical oxygen-generating cartridge having a severable hermetically-sealed container and an ignition device for igniting the cartridge. An actuating device at least a portion of which is fixed to the casing, is capable of actuating the ignition device only when the cartridge is disposed within the casing and the openable casing section is closed on the main casing section. In the described preferred embodiments, the portion of the actuating device fixed to the casing is cooperable with the ignition device to ignite the cartridge only when the cartridge is in effective position in the casing. The casing further includes a spring engageable by the cartridge and spacing same from its effective position to render the actuating device ineffective to actuate the ignition device except when the spring is compressed by the closing of the openable casing section on the main casing section.

Several embodiments of the invention are described below illustrating different means for severing the cartridge container. Thus, in one described embodiment, the severing means comprises a blade which pierces the cartridge container upon the closing of the openable casing section on the main casing section; and in two further described embodiments, the severing means comprises a weakened section, and a frangible section, respectively, of the cartridge container which is adapted to be severed by the pressure of the oxygen generated by the cartridge upon its ignition.

According to a further feature, the pressure casing includes a high-volume vent which is automatically actuated in case of the build-up of a high pressure within the casing, such as by the ignition of a contaminant (e.g. grease) therein, and which automatically restores the pressure integrity of the casing upon the removal of the high pressure.

According to other aspects, the invention provides oxygen supply systems including a plurality of such generators connected to an outlet manifold and including reservoir means for the generated oxygen and actuating means for actuating the ignition devices of the generators.

In one described embodiment, the system further includes a pressure switch sensing the pressure of the oxygen in the outlet manifold; and a sequencer circuit having a normally-closed time-delay switch controlled by said pressure switch such that when the outlet manifold pressure drops below a predetermined minimum, the pressure switch closes and the time-delay switch steps the sequencer circuit one step to cause same to energise the actuating means of the ignition device of the next generator in the sequence, whereupon the time-delay switch automatically opens for a predetermined time interval, at the end of which it automatically closes and, if the outlet manifold pressure is still below the predetermined minimum, the pressure switch, still being closed, causes the time-delay switch to step the sequencer circuit another step to energise the actuating means of the next generator ignition device in the sequence.

In a second described embodiment, the system includes a plurality of pressure switches, one for each cartridge, sensing the pressure of the oxygen in the outlet manifold, the pressure switches being normally open but being set to automatically close at different manifold pressures to cause the actuating device for the respective cartridge to actuate its ignition device upon sensing the respective closing pressure in the outlet manifold.

According to a further feature, the sealing means includes a spring-actuated high-volume vent automatically actuated upon the sudden build-up of a high pressure within the pressure casing. Thus, if contaminants had been introduced in the casing and become ignited upon the ignition of the cartridge, the venting means rapidly and safely relieves the pressure casing of the large volumes of hot gases produced by the ignition of the contaminants, thereby precluding damage to the casing, while permitting it to retain its capability of supplying oxygen to the outlet manifold.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENTS

Figures 1, 8A, 8B:
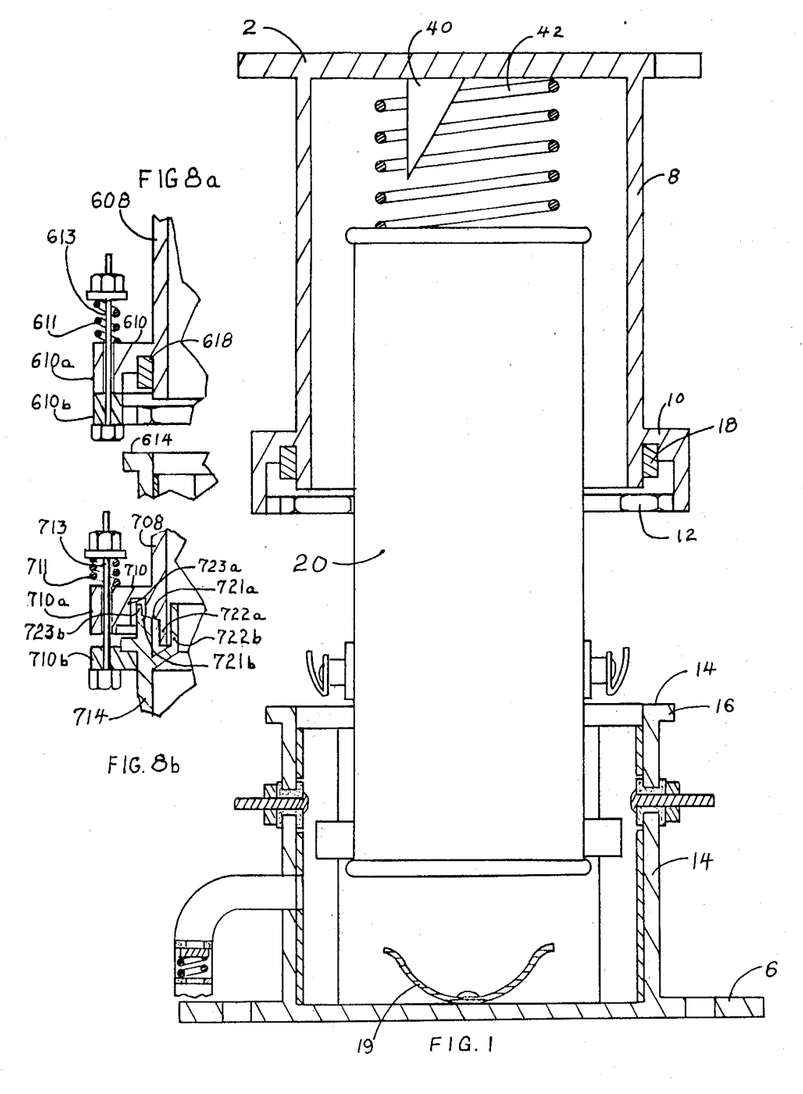
FIG. 1 is a vertical sectional view illustrating one form of replaceable cartridge type oxygen generator constructed in accordance with the invention.
FIGS. 8a and 8b are fragmentary views illustrating two arrangements that may be used for effecting high-volume pressure release.
Figure 2:
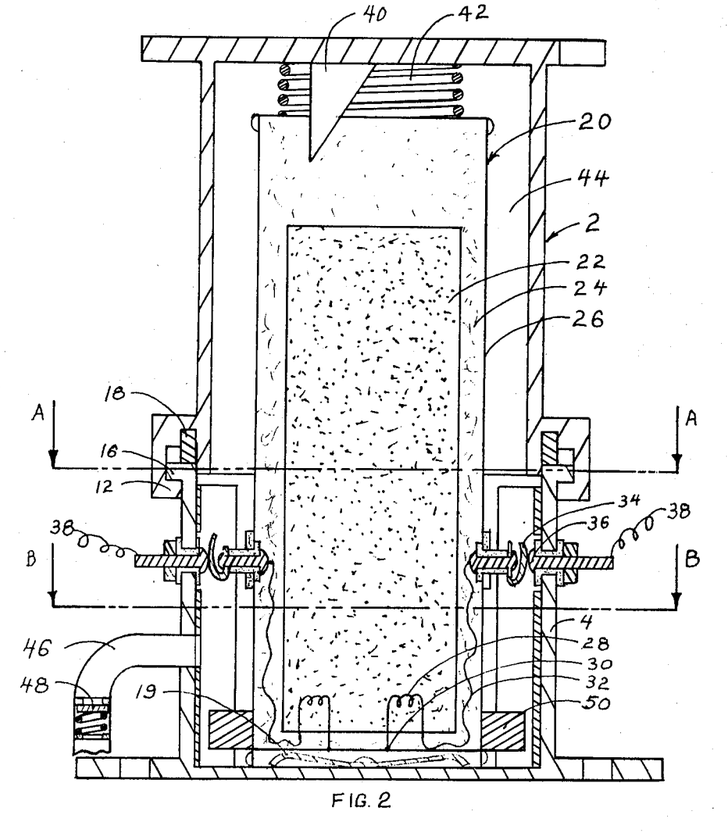
FIG. 2 is a view similar to that of FIG. 1 but showing the cartridge properly disposed in a closed casing ready for ignition, and also showing the construction of the cartridge.
Figure 2A:
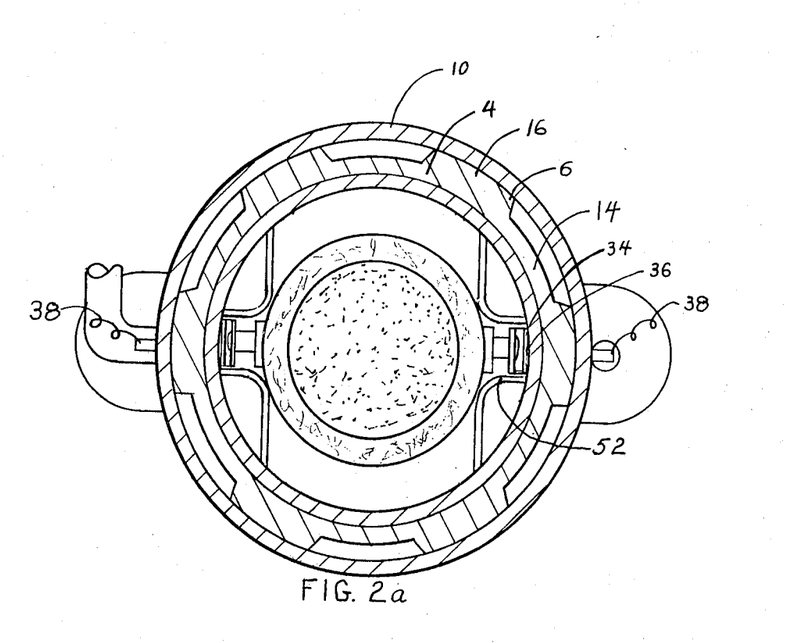
FIGS. 2a and 2b are transverse sectional views along lines A—A and B—B respectively, of FIG. 2.

The oxygen generator illustrated in FIGS. 1 and 2 comprises a casing, generally designated 2, made of a main or fixed casing section 4 adapted to be mounted in fixed position, such as by a pair of apertured mounting tabs 6, and an openable or removable section 8 adapted to be opened and closed to provide access to the interior of the casing. For this purpose, the lower end of the removable casing section 8 is formed with an annular flange 10 terminating on its lower face with a plurality of circumferentially-spaced lugs 12 (FIG. 2a); and the upper end of the fixed casing section 4 is formed with a rim 14 terminating with a plurality of circumferentially-spaced lugs 16 adapted to overlie lugs 12 of the removable casing section 8. The arrangement is such that the removable section 8 may be applied to the fixed section 4 by passing the former's lugs 12 through the spaces between the latter's lugs 16, and then twisting the removable section 8 to cause its lugs 12 to underlie lugs 16 of the fixed section 4. A sealing gasket 18 is interposed between flange 10 of the removable section 8 and rim 14 of the fixed section 4 to seal the two sections when attached together. In addition, a leaf-spring 19 is fixed to the bottom of the fixed casing section 4.

Disposed within the generator casing 2 is a hermetically-sealed chemical-oxygen-generating cartridge, generally designated 20. The cartridge may be of a known type, including a core 22 (FIG. 2) containing oxygen-generating material (e.g., sodium chlorate), an outer envelope 24 of insulation and filtration material, and an outer hermetically-sealed container 26 (e.g., of metal foil). An ignition means, for example, a pair of electrical igniters 28, is disposed in the core 22 containing the oxygen-generating material. Each electrical igniter 28 includes a lead 30 grounded to the metal casing 26, and a second lead 32 leading to electrical connector 34 disposed externally of, and insulated from, the metal container 26 of the cartridge. The connectors 34 for the electrical igniters 28 are in the form of leaf-springs cooperable with electrical connectors 36 attached to, and insulated from, the fixed section 4 of the generator casing 2.

The arrangement is such that when the cartridge 20 is properly inserted within the casing 2, and the removable casing section 8 properly attached to the fixed casing section 4, connector 34 of the cartridge is brought into engagement with connector 36 of the casing as shown in FIG. 2. Connector 36 is connected to an electrical conductor 38 leading to actuating means for actuating the igniters 28, as will be described more particularly below with respect to FIG. 6, so that the electrical igniters 28 are not enabled for actuation until the cartridge 26 is properly inserted within the casing 2, with the generator sealed and ready to produce oxygen.

The top of the removable casing section 8 carries a blade 40 which is adapted to pierce the metal container 26 of the cartridge when the cartridge is within the casing and the removable section 8 is applied to the fixed section 4 in the manner described above. A coil spring 42 is interposed between the top of the cartridge 20 and the lower face of the top of the removable casing section 8 to firmly hold the cartridge within the casing when the removable casing section 8 is attached to the fixed section 4.

The interior of the casing 2 is of larger diameter than the exterior of the cartridge 20 to provide a space 44 between the two for the storage of oxygen generated by the cartridge when its igniter 28 is actuated, as will be described below. Casing 2 further includes an outlet conduit 46 for outletting the generated oxygen. Outlet conduit 46 is provided with a one-way valve 48 permitting the outflow of the oxygen from casing 2, but blocking reverse flow into the casing.

Figure 2B:
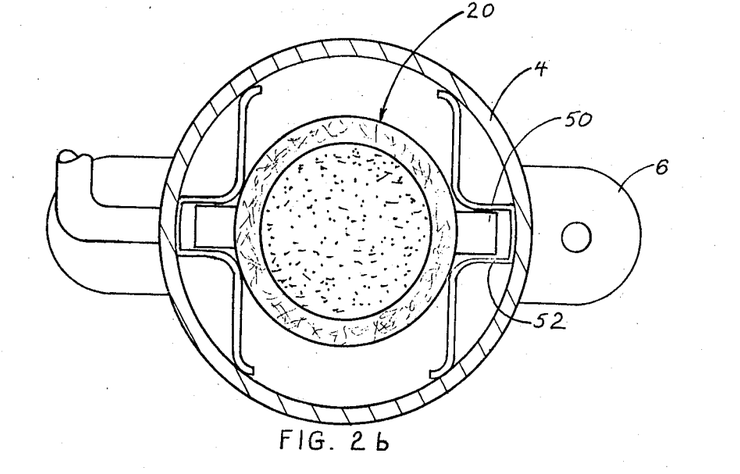

Cartridge 20 is provided with studs 50 receivable within channels 52 (FIG. 2b) in casing section 4 for guiding the positioning of the cartridge within the casing and for bringing the cartridge contacts 34 into electrical engagement with the casing contacts 36 when the cartridge is properly positioned within the casing.

The cartridge 20 may thus be conveniently replaced in the following manner: First, the removable casing section 8 is removed by rotating it to cause its lugs 12 to underlie the spaces between lugs 16 of the fixed casing section 4, enabling the removable casing section 8 to be lifted off the fixed casing section 4. The cartridge 20 may then be removed, and another, fresh cartridge inserted, studs 50 on the cartridge moving along channels 52 in the casing to guide the movement of the cartridge during this insertion. After the cartridge has been inserted, the removable casing section 8 is then reapplied and rotated to cause its lugs 12 to underlie and interlock with lugs 16 on the fixed casing section 4.

It will be seen that when the cartridge 20 has been properly positioned within the casing, and the two sections of the casing attached together in the above manner, contacts 34 of the cartridge will be in engagement with contacts 36 on the casing, thereby enabling the electrical igniter 28 for actuation. In addition, blade 40 will have pierced the outer metal container 26 of the cartridge 20, thereby readying the cartridge for generating and outputting oxygen through its outlet conduit 46 whenever its igniter 28 is actuated via conductor 38.

Figure 3A:
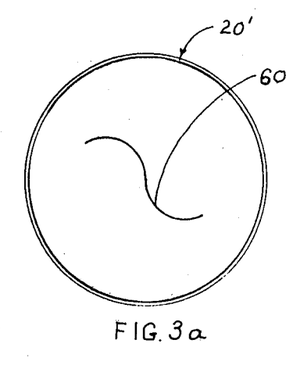
FIGS. 3a and 3b are top plan views illustrating modified cartridges that may be used.
Figure 3B:
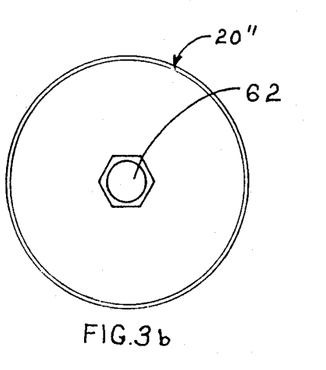

FIGS. 3a and 3b illustrate two variations for severing the hermetically-sealed container 20 of the cartridge by means other than a blade. Thus, as shown in FIG. 3a, the cartridge container 20' is provided with a weakened section 60, preferably in the upper end wall of the cartridge, which container is adapted to be severed by the pressure of the oxygen generated by the cartridge upon its ignition. In FIG. 3b, the container 20" is provided with a frangible disc 62 for the same purpose.

Figure 4A:
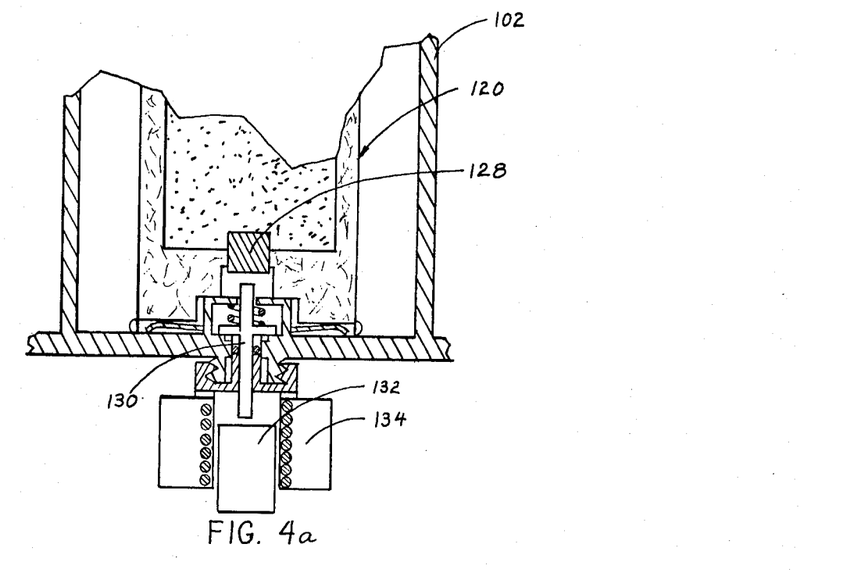
FIGS. 4a and 4b are fragmentary views illustrating modifications in the actuating devices of the oxygen generator of FIG. 1.
Figure 4B:
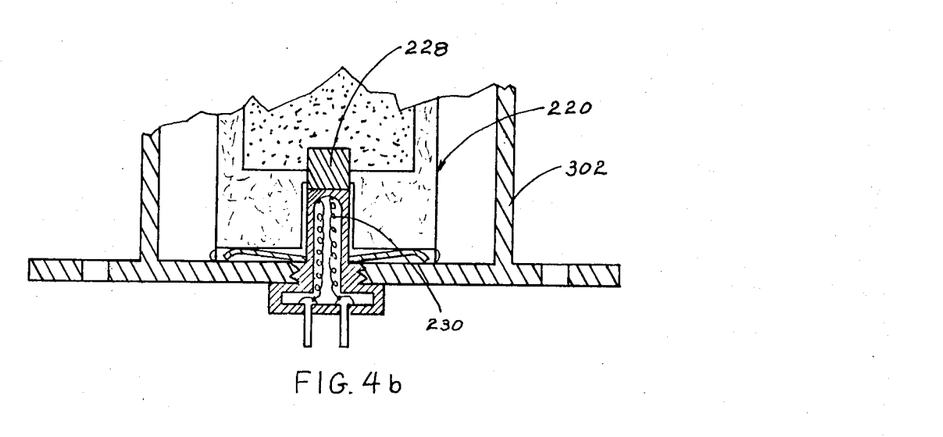

Instead of using electrical ignition devices 28, the cartridge could also use percussion-type ignition devices. This is more particularly illustrated in FIG. 4a, wherein it will be seen that the replaceable cartridge 120, disposed within casing 102, is provided with a pyrotechnic or hypergolic ignition cap 128 actuated by a percussion pin 130 driven by a solenoid plunger 132, the solenoid having a winding 134 connected to the electrical circuit for actuating the ignition device only when the cartridge is properly positioned within the casing and the casing is closed as described above. FIG. 4b illustrates a still further variation, in which the ignition device 228 of the replaceable cartridge 220 is also a pyrotechnic or hypergolic cap actuated by a heating element actuator 230 carried by the casing 302. In both cases the cap is alignable with the actuator percussion pin or heating element, and therefore actuatable thereby, only when the cartridge is properly positioned in the casing and the casing is properly closed, as described above.

Instead of providing the outlet conduit with a one-way valve 48 effective to permit flow outwardly from the casing but not inwardly into the casing, as described above with respect to FIGS. 1 and 2, the outlet conduit from the oxygen generator casing may be provided with a valve which is normally closed, but which may be automatically opened when its removable casing section is attached to its fixed casing section. This permits a plurality of the oxygen generators to be included in a system with the interiors of all their casings interconnected through their latter valves so that they serve as a common reservoir for the oxygen generated by all the generators. The valves permit the generators to be recharged, in safety, while the system remains in operation. Such a construction is described in the oxygen generators illustrated in FIGS. 5, 5a, and 5b, and is used in the system illustrated in FIGS. 6 and 7.

Figure 5:
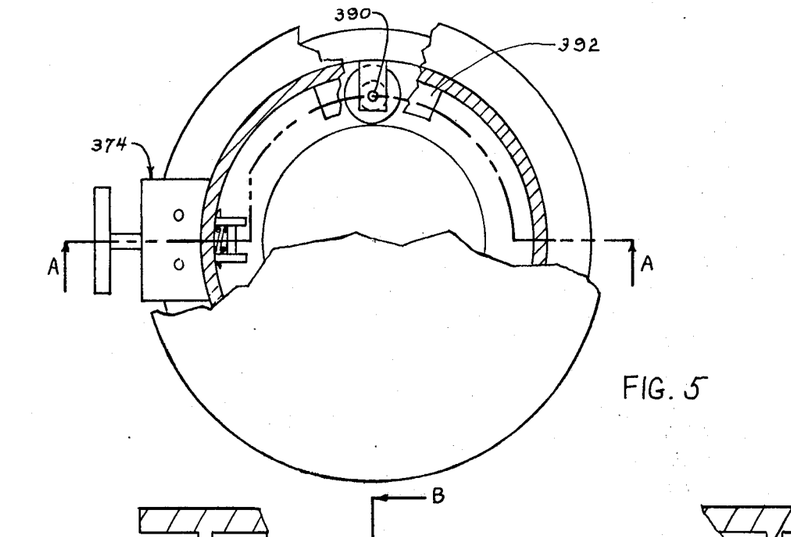
FIG. 5 is a fragmentary view illustrating a further modification in the oxygen generator of FIGS. 1 and 2.
Figure 5A:
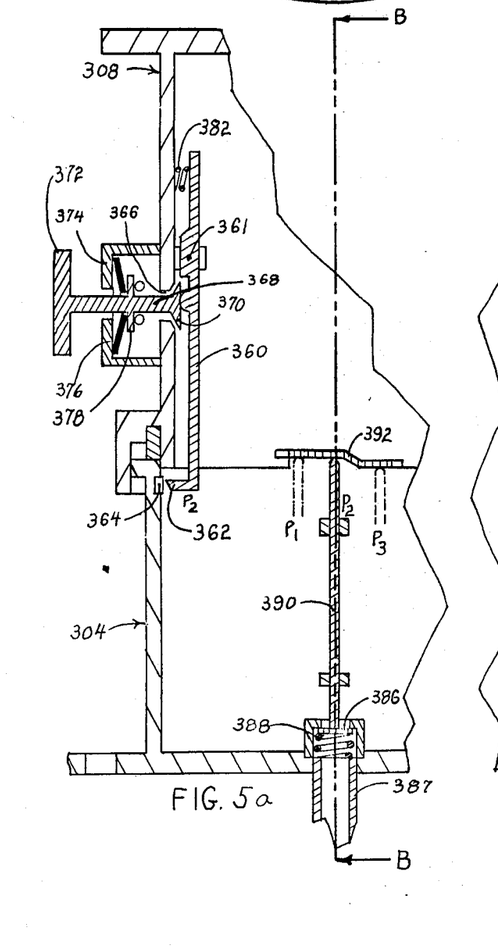
FIGS. 5a and 5b are sectional views along lines A—A of FIG. 5 and line B—B of FIG. 5a, respectively.
Figure 5B:
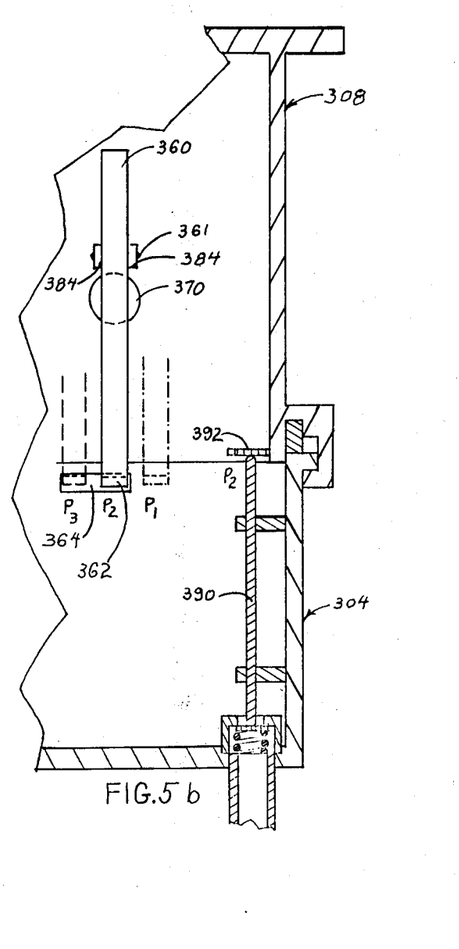

More particularly, the generator casing is provided with a latch plate 360 pivotable at 361 to the removable casing section 308 and having a tongue 362 movable into a recess 364 formed in the wall of the fixed casing section 304. In addition, the removable casing section 308 is formed with a port 366 through which passes a valve stem 368 carrying a valve disc 370 internally of the casing section 308 and movable by the pressure within the casing to close port 366. Valve stem 368 includes a depression button 372 externally of casing section 380 and depressible to move the valve disc 370 away from port 366 to open the port. The external portion of stem 368 between its depressible button 372 and casing section 308 is formed with an apertured collar 374 enclosing a conical, bistable Belleville spring 376 interposed between an annular rib 378 formed on stem 368 and collar 374.

Valve disc 370 bears against a midportion of latch plate 360. One end of the latch plate bears against a spring 382 between it and the inner face of casing section 308, and the opposite end of the latch plate carries the above-mentioned tongue 362 seatable within recess 364 formed in the fixed casing section 304. Accordingly, depending upon the position of valve disc 370, as will be described more particularly below, tongue 362 may be received within, or spaced from, recess 364 in order to latch or unlatch, respectively, the removable casing section 308 from being rotated with respect to the fixed casing section 304. A pair of studs 384 formed on the inside of the removable casing section 308 straddle latch plate 360 to guide its pivotal movement bringing its tongue 362 towards and away from recess 364.

In addition, the outlet conduit 387 from the fixed casing section 304 is provided with a valve 386 which is normally urged to its closed position by a coil spring 388. Valve 386 is formed with a stem 390 projecting upwardly into the casing and cooperable with a cam element 392 carried by the removable casing section 308. As shown particularly in FIG. 5, the outlet conduit 387, and the cam element 392 cooperable with the valve 386 in the latter, are both located eccentrically of the casing, adjacent to one side (top, in FIG. 5) of the casing.

It will be seen that cam element 392, being carried by the removable casing section 308, will be moved with respect to the upper end of the valve stem 390 during the rotation of the removable casing section. Cam element 392 may assume one of three positions during the rotation of the removable casing section 308, namely: positions P1 and P2, wherein, as shown particularly in FIG. 5a, it permits stem 390 to rise to close valve 386; and position P3, wherein it depresses stem 390 to open valve 386. As shown particularly in FIG. 5b, when valve stem 390 relative to cam element 392 is in position P1, tongue 362 of latch plate 360 is disposed to one side (right side FIG. 5b) of the latching recess 364 formed on the inner face of the fixed casing section 304; and when the cam element is in positions P2 and P3, tongue 362 of latch plate 360 is aligned with recess 364 so that it is capable of latching the casing sections together.

The device illustrated in FIGS. 5, 5a and 5b is used in the following manner:

First, when attaching the removable casing section 308 to the fixed casing section 304, the removable casing section 308 first assumes the position wherein cam element 392 is in position P1 with respect to valve stem 390, so that valve 386 is closed under the action of spring 388. Casing section 308 is then rotated to bring its cam element 392 to position P2, wherein valve 386 remains closed, and finally to position P3, wherein valve 386 is opened. When valve 386 is thus opened, the interior of its casing is connected via its valve 386 to the output system utilizing the oxygen generated by the cartridge disposed within that casing.

As will be described more particularly below with respect to FIG. 6, when a plurality of such generators are connected together in an oxygen supply system supplying oxygen through a common output manifold, the foregoing arrangement, wherein the output valve 386 is automatically opened when the two sections of the respective casing are properly attached together, permits the interiors of all the generators to serve as a common reservoir for the oxygen generated by the system, thereby obviating the need for a common reservoir.

When it is desired to replace a spent cartridge, casing section 308 of the respective generator would be rotated in the opposite direction moving cam element 392 relative to stem 390 from position P3 to position P2, wherein valve 386 is closed. Latching recess 364 in which tongue 362 of latching plate 360 is seated, prevents the further rotation of casing section 308. Button 372 would then be depressed to permit the discharge of any oxygen still within the interior of that particular generator. This depressurizes the interior of the generator such that the conical spring 376 holds valve disc 370 out of port 366, thereby moving latching plate 360 outwardly to unseat its tongue 362 from recess 364, permitting casing section 308 to be further rotated to remove same from the fixed casing section 304. However, should that particular cartridge still be generating oxygen, the interior of the casing will not be depressurized by depressing button 372, so that valve disc 370 will close port 366 against the action of spring 376, thereby moving tongue 362 of latching plate 360 into recess 364, preventing the further rotation of casing section 308.

A fail-safe arrangement is thus provided preventing the detachment of casing section 308 from the fixed casing section 304 at any time the interior of the casing is pressurized, either because valve 386 is open, or because the cartridge contained within the generator is still generating oxygen. Further, since spring 376 is of the conical bistable type, button 372 may be pulled (rather than pushed) to cause tongue 362 to enter recess 364, and thereby to latch casing section 308 against rotation, even though the interior of the generator is not pressurized.

It will be appreciated that the oxygen generator illustrated in FIGS. 5, 5a and 5b would include one or more of the constructional features described above with respect to FIGS. 1-4b.

Figure 6:
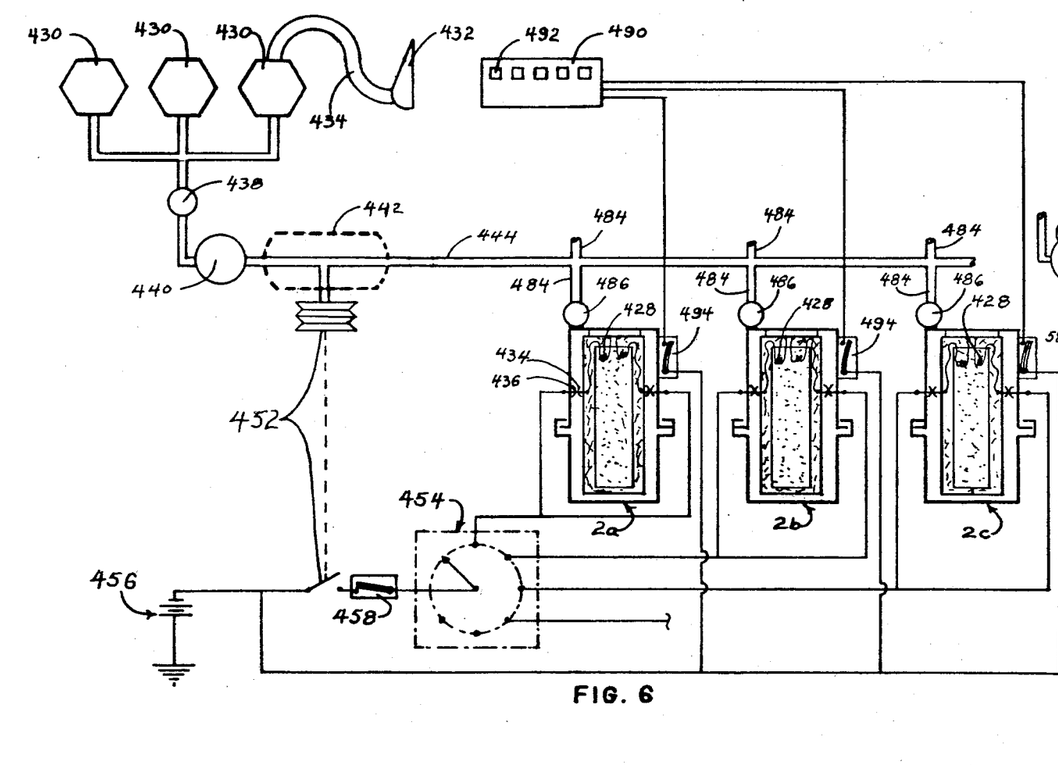
FIGS. 6 and 7 are schematic diagrams illustrating two forms of oxygen supply systems including a plurality of the replaceable cartridge generators according to FIGS. 5, 5a and 5b.

FIG. 6 illustrates an oxygen supply system, generally similar to the one described in my prior U.S. Pat. No. 3,981,300, but including the replaceable cartridge-type oxygen generators described above with respect to FIGS. 5, 5a and 5b, as well as the previously described figures.

The oxygen supply system illustrated in FIG. 6 comprises a plurality of stations 430 each having an oxygen mask 432 connected by a hose 434. All the stations 430 are supplied through an oxygen distribution system which includes a shut-off valve 438 and a pressure reducer 440. The oxygen is supplied from a plurality of generators 2a, 2b, 2c all of the two casing section construction and including the igniters 428, and the enabling connectors 434, 436, as described above. All the generators are connected to a common output manifold 444 via an output conduit 484 from each generator, each output conduit including a valve 486 corresponding to valve 386 described with respect to FIGS. 5a and 5b. Since the latter valves 486 are all open when the two casing sections of the respective generator are properly attached together, as described above, the interiors of the casings serve as a common reservoir for the oxygen generated by the generators, and therefore a separate reservoir is not necessary. Such a separate reservoir, however, has been shown schematically by broken lines 442 in case it is desired to be included.

The system illustrated in FIG. 6 further includes a pressure switch 452 sensing the pressure in the outlet manifold 444 (or in the separate reservoir 442 when used) such that, when the pressure drops below a predetermined minimum, it closes. The latter switch is in an electrical circuit to an electrical sequencer 454 adapted to sequentially actuate the ignition devices of the generators 2a-2c. Sequencer 454 is supplied from a voltage source 456 via a time delay, e.g. bimetallic switch 458 in series with the pressure switch 452, time delay switch 458 being normally closed, and effective to step sequencer 454 one step whenever pressure switch 452 is closed; as soon as time delay switch 458 steps sequencer 454, it automatically opens for a predetermined dwell interval, for example five seconds, and then closes again, so that if pressure switch 452 is still closed, it will step sequencer 454 another step to cause same to ignite the next generator in the sequence.

Accordingly, if after one generator has been ignited, the dwell period of the time delay switch 458 has elapsed and the pressure, as sensed by pressure switch 452, is still below the predetermined minimum, another oxygen generator will be automatically ignited even though the first one is still generating oxygen. The foregoing arrangement assures a fast and reliable build-up of pressure in the system, and a continuous maintenance of that pressure so that it does not drop below the predetermined minimum.

The system illustrated in FIG. 6 further includes an indicator panel 490 having a plurality of indicator devices 492, one for each of the generators. Each of the generators further includes a temperature sensitive device 494 (e.g., a bimetallic switch) effective, upon sensing a predetermined temperature within the casing of the respective generator 2a-2c, which temperature is reached when the generator is generating oxygen, to indicate same by actuating the respective device 492 on the indicator panel 490.

Figure 7:
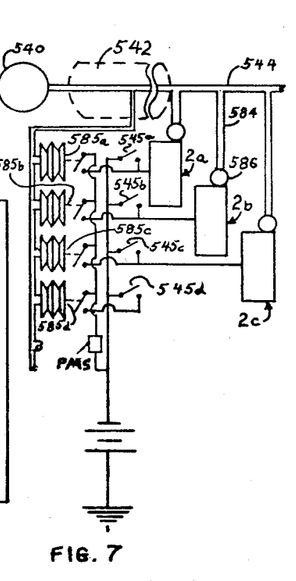

FIG. 7 illustrates another form of oxygen supply system including a plurality of generators 2a, 2b, 2c, all of the same construction and including the igniters 428 as described with respect to FIG. 6. All the generators are connected to a common output manifold 544 connected to the pressure reducer 540, the manifold being supplied by each generator via an output conduit 584 including a valve 586, corresponding to valve 386 described above. As also described above, valves 586 are all open when the two casing sections of the respective generator are properly attached together, so that the interiors of the casings serve as a common reservoir for the oxygen generated by the generators, but if desired, a separate reservoir may be provided, shown schematically in broken lines at 542.

Whereas the system of FIG. 6 includes a sequencer 454 which sequentially actuates the ignition devices of the generators in response to the pressure sensed by a pressure switch 452 in the outlet manifold, the system of FIG. 7 includes a plurality of pressure switches 585a-585d, one for each generator, and each including an override switch 545a-545d. The pressure switches are normally open but are set to automatically close at different manifold pressures to cause the actuating device for the respective generator to actuate its ignition device upon sensing the respective closing pressure in the outlet manifold. Thus, pressure switch 585a controlling generator 2a may be set to close at a manifold pressure of 145 to 150 psi; pressure switch 585b controlling generator 2b may be set to close at a pressure of 135 to 140 psi; and pressure switch 585c controlling generator 2c may be set to close at a pressure of 125 to 130 psi. A manually-operated pressure master switch PMS is used for starting-up.

Thus, the system operation is started by opening switch PMS which disables all the pressure switches 585a-585d. One of the generators is then ignited, by closing its respective override switch 545a-545d, to pressurize the system, whereupon switch PMS is closed thereby enabling the pressure switch to maintain the pressure. For example, if the pressure should drop below 150 psi, pressure switch 585a automatically ignites generator 2a, and so on with the other generators. Any generator may be manually ignited by closing its respective override switch 545a-545d.

In handling the cartridges, it may happen that one may become contaminated by a quantity of a material, e.g. grease, which may ignite to produce a rapid build-up of pressure within the pressure casing, thereby creating the danger of an explosion. To prevent this possibility, the pressure-casing may include a high-volume venting means automatically actuated upon the sudden build-up of a high pressure within the casing. Two such arrangements are illustrated in FIGS. 8a and 8b.

In FIG. 8a, the annular flange 610 formed on the lower end of the removable casing section 608 is split into two separate rings, 610a and 610b, spring-urged together by a plurality of circumferentially-spaced springs 611 received on bolts 613 passing through the rings. As in FIG. 1, seal 618 is brought to bear against the flange 614 of the fixed casing section. However, should there be a sudden build-up of pressure within the casing, as might be caused for example by the ignition of grease or other contaminant on the cartridge or on the inner face of the casing, springs 611 permit the two rings 610a and 610b to spread apart, causing seal 618 to part from flange 614 on the fixed casing section, thereby producing a high-volume venting of the gases.

In FIG. 8b, the annular flange 710 is similarly split to form the two rings 710a, 710b, which rings are spring-urged towards each other by circumferentially-spaced springs 711 received on bolts 713, as in FIG. 8a. In the arrangement of FIG. 8b, however, the seal is formed by the lower metal surface 721a of ring 710a, and the upper surface 721b of the lower casing section 714; in addition, each of these surfaces, providing the metal-to-metal seal, is circumscribed on opposite sides by protecting annular lips. Thus, the sealing surface 721a in ring 710a is circumscribed on opposite sides by annular lips 722a and 723a; and the sealing surface 721b on the fixed casing section 714 is circumscribed on opposite sides by annular lips 722b and 723b. In addition, as shown in FIG. 8b, lips 722a and 723a of ring 710a are offset with respect to lips 722b and 723b of the fixed casing section 714, to produce a labyrinth venting passageway upon the movement apart of the two sealing surfaces 721a and 721b.

Thus, in the case of a sudden build-up of an unduly high pressure within the pressure casing, the openable casing section 708 carrying ring 710a and sealing surface 721a, will move away, against the action of springs 711, from the main casing section 714 carrying ring 710b and sealing surface 721b, thereby enabling a high-volume venting of the casing. As soon as the pressure within the casing drops, springs 711 restore the metal-to-metal seal between the openable casing section 708 and the main casing section 714, thereby maintaining the integrity of the system. In addition, the lips 722a, 723a circumscribing sealing surface 721a, and the lips 722b, 723b circumscribing sealing surface 721b, not only protect their respective sealing surfaces from exposure to damage during handling, but also produce a relatively long labyrinth passageway for cooling the gases vented to the atmosphere, thereby rendering them harmless.

While the invention has been described with respect to several preferred embodiments, it will be appreciated that many other variations, modifications and applications of the invention may be made.

What is claimed is:

1. A replaceable cartridge type oxygen generator, comprising: a quick-opening pressure casing including a main casing section, an openable casing section quickly openable and closable with respect to the main casing section, and sealing means sealing the two sections when closed together; a chemical oxygen-generating cartridge disposed within the casing, said chemical oxygen-generating cartridge having a severable hermetically sealed container and an ignition device for igniting the cartridge; an actuating device at least a portion of which is fixed to the casing so as to be cooperable with said ignition device to ignite the cartridge when the cartridge is in effective position within the casing, and a spring engageable by the cartridge and spacing same from said effective position to render the actuating device ineffective to actuate the ignition device except when the spring is compressed by the closing of the openable casing section on the main casing section.

2. A generator according to claim 1, wherein said casing further includes piercing means effective to sever said container upon closing the openable casing section on the main casing section.

3. A generator according to claim 2, wherein said piercing means comprises a blade carried by the openable casing section.

4. A generator according to claim 1, wherein said cartridge container includes a weakened section adapted to be severed by the pressure of the oxygen generated by the cartridge upon its ignition.

5. A generator according to claim 1, wherein said cartridge container includes a frangible section adapted to be severed by the pressure of the oxygen generated by the cartridge upon its ignition.

6. A generator according to claim 1, wherein said actuating device is an electrical actuator and includes a first electrical contact carried by said cartridge, and a second electrical contact carried by said casing, said electrical contacts being brought into engagement with each other only when the openable casing section is closed on the main casing section.

7. A generator according to claim 1, wherein said ignition device is an electrical igniter.

8. A generator according to claim 1, wherein said ignition device is a pyrotechnic-type igniter.

9. A generator according to claim 1, wherein said ignition device is a hypergolic-type igniter.

10. A generator according to claim 1, wherein said actuator includes an electrically-actuated percussion element.

11. A generator according to claim 1, wherein said actuator includes an electrically-actuated heating element.

12. A generator according to claim 1, wherein said casing includes an outlet conduit for outletting the oxygen generated by the cartridge, and a one-way valve effective to permit oxygen flow outwardly from the casing but not inwardly into the casing.

13. A generator according to claim 1, wherein said sealing pressure casing includes a high-volume venting means automatically effective to move the openable casing section away from the main casing section upon the sudden build-up of an unduly high pressure within the pressure casing, and to restore the openable casing section against the main casing section upon the drop of the pressure in the pressure casing.

14. A generator according to claim 13, wherein said venting means comprises a metal surface carried by the openable casing section spring-urged into engagement with a metal surface carried by the main casing section but movable apart by a build-up of a high pressure within the pressure casing to produce the high-volume venting thereof.

15. A generator according to claim 14, wherein each of said engaging metal surfaces is circumscribed on opposite sides by protecting annular lips, said lips being off-set from each other in the two surfaces to produce a labyrinth venting passageway upon their movement apart which passageway cools the vented gases.

16. A system for supplying oxygen, comprising: a plurality of oxygen generators each according to claim 1; conduit means connecting said oxygen generators to an outlet manifold; reservoir means communicating with said outlet manifold for storing the generated oxygen; and a plurality of pressure switches, one for each generator, sensing the pressure of the oxygen in the outlet manifold, said pressure switches being normally opened but being set to automatically close at different manifold pressures to cause the actuating device for the respective generator to actuate its ignition device upon sensing the respective closing pressure in the outlet manifold.

17. A system for supplying oxygen, comprising a plurality of oxygen generators each including a pressure casing having a main casing section, an openable casing section, and sealing means sealing the two sections when closed together; means for receiving within the casing a chemical oxygen-generating cartridge having a severable hermetically sealed container and an ignition device for igniting the cartridge; an actuating device capable of actuating the ignition device only when the cartridge is disposed within the casing and the openable casing section is closed on the main casing section; and conduit means connecting said oxygen generators to an outlet manifold, the casing of each of said oxygen generators having a volume which is sufficiently greater than that of its cartridge so as to permit the interiors of all the casings to act as a common reservoir for the storage of oxygen generated by the generators.

18. A system according to claim 17, further including means for automatically isolating each generator from the system when its pressure casing is open, so as to permit the cartridge in the generator to be replaced even while the system remains operable and in service.

19. A system according to claim 18, wherein said isolating device is a valve for each generator which valve is automatically opened when its casing sections are closed to permit the interiors of all the casings to act as a common reservoir, and which valve is automatically closed when its casing sections are opened to permit the recharging of spent generators.

20. A system according to claim 17, further including a pressure switch sensing the pressure of the oxygen in the outlet manifold; and a sequencer circuit having a normally-closed time-delay switch controlled by said pressure switch such that when the outlet manifold pressure drops below a predetermined minimum, the pressure switch closes and the time-delay switch steps the sequencer circuit one step to cause same to energize the actuating means of the ignition device of the next generator in the sequence, whereupon the time-delay switch automatically opens for a predetermined time interval, at the end of which it automatically closes and, if the outlet manifold pressure is still below the predetermined minimum, the pressure switch, still being closed, causes the time-delay switch to step the sequencer circuit another step to energize the actuating means of the next generator ignition device in the sequence.

21. A system acording to claim 17, further including indicator means having an indicator for each of said generators; each of said generators further including a temperature-sensitive device effective, upon sensing a predetermined temperature within the casing of the actuated generator which temperature is reached when the generator is generating oxygen, to indicate same on said indicator means.

22. A generator including a pressure casing having a main casing section, an openable casing section, and sealing means sealing the two sections when closed together; means for receiving within the casing a chemical oxygen-generating cartridge having a severable hermetically-sealed container and an ignition device for igniting the cartridge; an actuating device capable of actuating the ignition device only when the cartridge is disposed within the casing and the openable casing section is closed on the main casing section; said casing of each generator including an interlocking device effective to prevent opening of the openable casing section when the casing is pressurised.

23. A generator according to claim 22, wherein said interlocking device includes manual pressure-relief means and comprises: a port formed in said casing; a valve stem passing through said port and including a valve disc internally of the casing movable by the pressure therein towards the port to close same and a button externally of the casing and depressable to move the valve disc away from the port to open same; a spring urging the valve disc away from the port to open same; and a latching member engageable by said valve disc and effective to latch the casing, preventing the opening thereof, when the valve disc is in its closed position, and to unlatch the casing, permitting the opening thereof, when the valve disc is in its open position.

24. A generator according to claim 23, wherein said spring is a bistable snap-action spring tending to hold the valve disc in either its open or closed position.

25. A generator according to claim 23, wherein said normally-closed valve includes a stem bearing against a cam element carried by the openable casing section, said cam element having a first surface effective to close the valve when the casing is in an unlatched position; a second surface effective to close the valve when the casing is in a first, latched position; and a third surface effective to open the valve when the casing is in a second, latched position.

* * * * *